United States Patent
Yamamoto

(10) Patent No.: US 6,714,651 B2
(45) Date of Patent: Mar. 30, 2004

(54) FM STEREO SIGNAL DEMOUDULATING APPARATUS AND METHOD

(75) Inventor: Yuji Yamamoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 563 days.

(21) Appl. No.: 09/822,484

(22) Filed: Apr. 2, 2001

(65) Prior Publication Data

US 2001/0026621 A1 Oct. 4, 2001

(30) Foreign Application Priority Data

Mar. 31, 2000 (JP) ........................................ 2000-099765

(51) Int. Cl.[7] .................................................. H04H 5/00
(52) U.S. Cl. .............................................. 381/2; 381/3
(58) Field of Search ............................ 381/1, 2, 3, 14, 381/16, 4; 329/315, 318

(56) References Cited

U.S. PATENT DOCUMENTS

| | | | | |
|---|---|---|---|---|
| 4,506,376 A | * | 3/1985 | Noguchi | 381/4 |
| 4,651,107 A | * | 3/1987 | Akaiwa | 329/341 |
| 5,442,709 A | | 8/1995 | Vogt et al. | |
| 6,020,784 A | * | 2/2000 | Fujii | 329/318 |

OTHER PUBLICATIONS

Japanese Abstract No. 01007734, dated Jan. 11, 1989.
Japanese Abstract No. 01007735, dated Jan. 11, 1989.

* cited by examiner

Primary Examiner—Xu Mei
Assistant Examiner—Brian T. Pendleton
(74) Attorney, Agent, or Firm—Sughrue Mion, PLLC

(57) ABSTRACT

An FM stereo signal demodulating apparatus includes a bandpass filter 1 for extracting a 19 Hz signal from an FM detected signal; a first phase shifter 21 for phase-shifting the 19 Hz signal by 90 degree; a first XOR 22 for taking an exclusive OR between an output from the first phase-shifter 21 and the 19 KHz signal; a second phase shifter 23 for phase-shifting an output signal from said XOR 21; a second XOR 24 for taking an exclusive OR between an output from the first XOR 22 and an output from the second phase shifter; an inverter 25 for inverting an output from said XOR 24; a third phase-shifter for phase-shifting an output signal from said inverter 25; a third XOR for taking an exclusive OR between an output from said third phase-shifter 26 and an output from said first XOR 22; a first multiplier 3 for multiplying an output from said first XOR 22 and said FM detected signal; a second multiplier 4 for multiplying an output from said third XOR 27 and said FM detected signal; a third multiplier 5 for multiplying an output from said second multiplier 4 by √2–1; a first adder 6 for adding an output from said first multiplier 3 and an output from said third multiplier 5; a second adder for adding said FM detected signal and an output from said first adder 6; and a subtracter 8 for subtracting an output from said first adder 6 from said FM detected signal. In this configuration, the FM stereo demodulating apparatus can operate as a low speed.

9 Claims, 3 Drawing Sheets

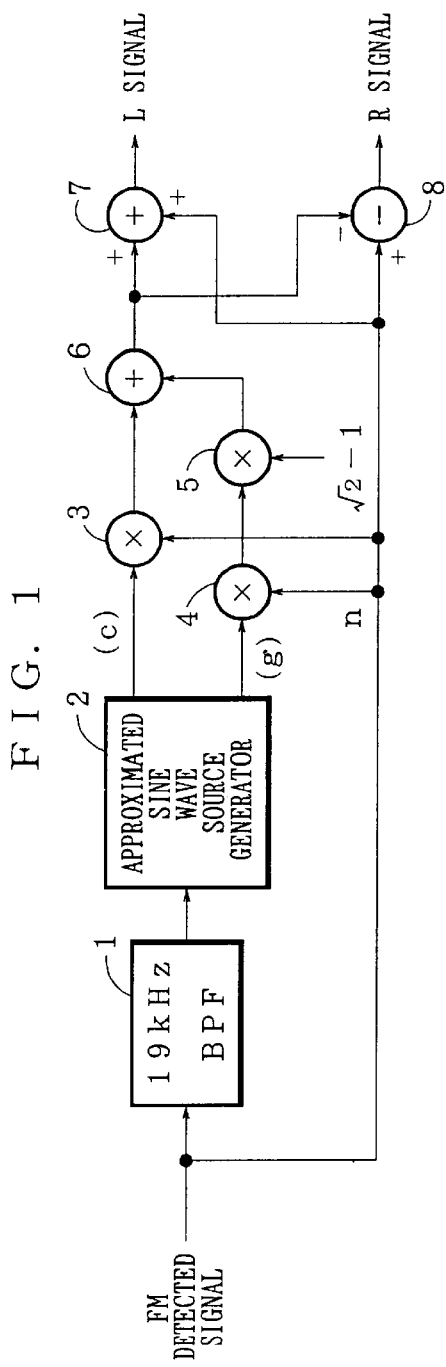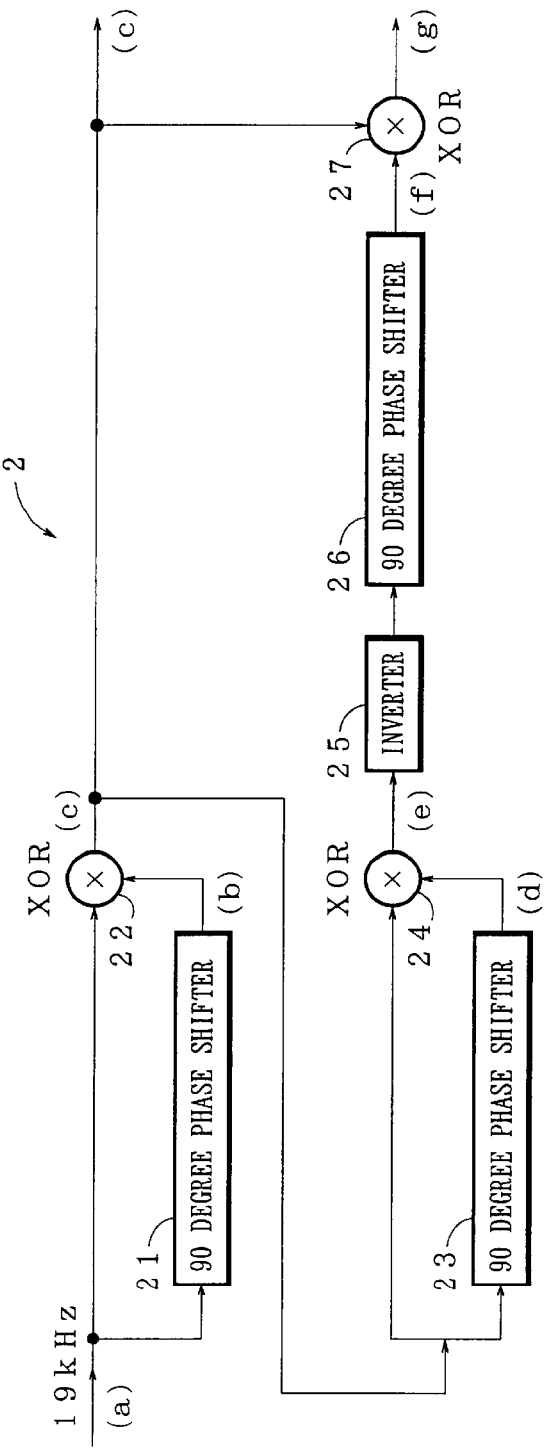

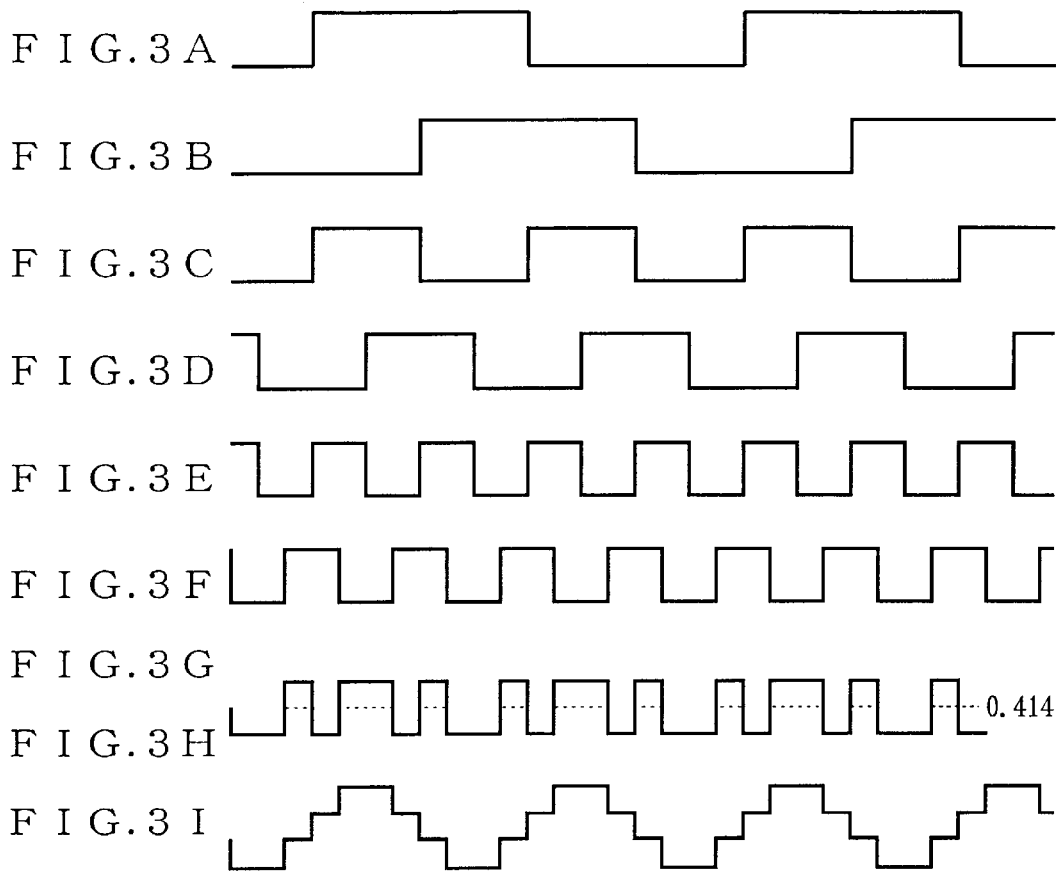
FIG. 3A
FIG. 3B
FIG. 3C
FIG. 3D
FIG. 3E
FIG. 3F
FIG. 3G
FIG. 3H
FIG. 3I
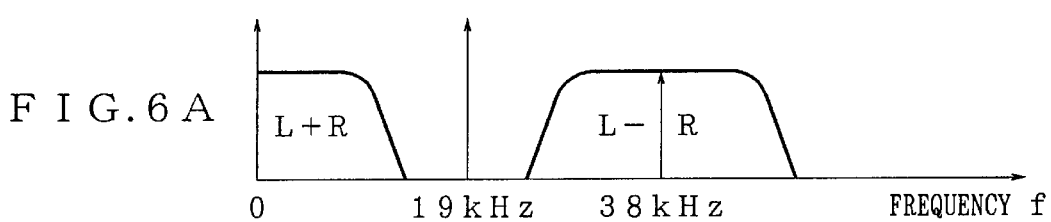
FIG. 6A
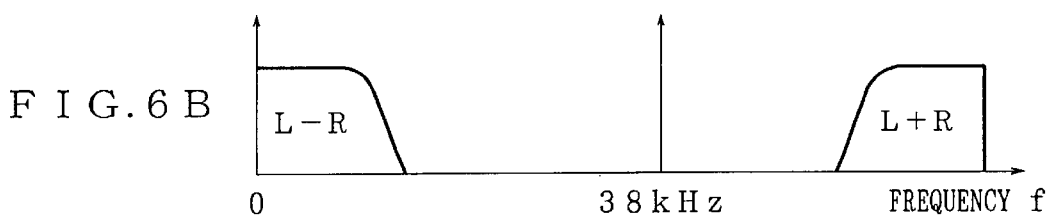
FIG. 6B

FM STEREO SIGNAL DEMOUDULATING APPARATUS AND METHOD

BACKGROUND OF THE INVENTION

1. Field of the Invention

This invention relates to an FM stereo signal demodulating apparatus and method for demodulating an (L−R) signal multiplexed on an (L+R) signal included in an FM detected signal to acquire an L signal and an R signal.

2. Description of the Related Art

In the reception of FM stereo broadcasting, when a received FM wave is FM detected, as seen from FIG. 6A, an (L −R) signal has been multiplexed on an (L+R) signal. In order to demodulate such a multiplexed signal to an L signal and an R signal, an FM stereo signal demodulating apparatus as shown in FIG. 4 has been proposed.

In FIG. 4, the FM stereo signal demodulating apparatus includes a 19 KHz bandpass filter (BPF) 1 for extracting a signal at 19 KHz from the FM detected signal, an approximated sine wave generator 30 for generating a carrier signal at 38 KHz from the signal at 19 KHz, a multiplier 31 for multiplying the FM detected signal by the carrier signal at 38 KHz to demodulate the (L−R) signal, an adder 7 and a subtracter 8.

The carrier signal at 38 KHz and the FM detected signal are multiplied so that the (L−R) signal is demodulated as shown in FIG. 6B.

The signals shown in FIGS. 6A and 6B are subjected to addition in the adder 7 to produce an L signal of 2L. The signals shown in FIGS. 6A and 6B are also subjected to subtraction in the subtracter 8 to produce an R signal of 2R.

The L signal and the R signal are supplied to a speaker (not shown) in which these signals are converted into an audio signal.

The other multiplexed signal than 2L is also produced from the adder 7 and the other multiplexed signal than 2R is also produced from the subtracter 8. However, these multiplexed signals are outside an audio frequency range and hence are not produced as sound from the speaker.

The FM stereo signal demodulating apparatus explained with reference to FIG. 4 is operated through digital signal processing and the approximated sine wave generator 30 the details of which is shown in FIG. 5 generates a signal at 38 KHz.

In FIG. 5, the approximated sine wave generator 30 includes a 90-degree phase shifter 21 for 90-degree phase shifting the phase of the 19 KHz signal, an XOR 22 for taking an exclusive OR between the 19 Hz signal and the output signal from the 90-degree phase shifter 21, another 90-degree phase shifter 23 for 90-degree shifting the phase of the output signal from the XOR 22, another XOR 24 for taking an exclusive OR between the output from the XOR 23 and the output from the 90-degree phase shifter 23, an inverter 25, still another 90-degree phase shifter 26 for 90-degree phase shifting the output signal from the inverter 25, still another XOR 27 for taking an exclusive OR between the outputs from XOR 22 and from the 90-degree phase shifter 90, a multiplier 32 for multiplying the output signal from the XOR 27 by √2−1, and an adder 33 for adding the output from the XOR 27 and the output from the multiplier 32.

An explanation will be given of the operation of the approximated sine wave generator 30.

When the 19 KHz signal shown in FIG. 3A is fed to the approximated sine wave generator 30, the signal shown in FIG. 3B is produced from the 90-degree phase shifter 21, and the signal shown in FIG. 3C is produced from the XOR 22.

The signal shown in FIG. 3D is produced from the 90-degree phase shifter 23, and the signal shown in FIG. 3E is produced from the XOR 24.

When the output from the XOR 24 is inverted by the inverter 25 and 90-degree phase-shifted by the 90-degree phase shifter 26, the signal shown in FIG. 3F is produced from the 90-degree phase shifter 26.

The exclusive OR between the output from the XOR 22 and the output from the 90-degree phase shifter is taken by the XOR 27 so that the signal shown in FIG. 3G is produced from the XOR 27.

The output from the XOR 27 is multiplied by √2−1 in the multiplier 32, the signal having an amplitude of 0.414 indicated by dotted line in FIG. 3H is produced from the multiplier 31.

The output from the XOR 22 and output from the multiplier 32 are added in the adder 33 so that the signal shown in FIG. 3I is produced from the adder 33.

The signal shown in FIG. 3I has a period of 38 KHz that is twice as long as that of the 19 KHz signal and an amplitude approximated to a sine wave.

As described above, in the above conventional FM stereo signal demodulating apparatus, as shown in FIG. 4, the multiplier 31 multiplies the m bit signal from the approximated sine wave generator 30 and the FM-detected n bit signal.

The multiplication of m bits×n bits is carried out by adding m bits by n-times. This takes a relatively long time. In order to complete the multiplication within a prescribed time, the multiplier which can be operated at a high speed is required. This leads to an increase in the production cost.

SUMMARY OF THE INVENTION

An object of this invention is to provide an FM stereo signal demodulating apparatus and method which can be operated at a low speed.

In order to attain the above object, in accordance with a first aspect of this invention, there is provided an FM stereo signal demodulating apparatus comprising:

a filter for extracting a 19 Hz signal from an FM detected signal;

a first phase-shifter for phase-shifting the 19 Hz signal by 90 degree;

first logic circuits for taking an exclusive OR between an output from the first phase-shifter and the 19 KHz signal;

a second phase-shifter for phase-shifting by 90 degree an output signal from the first logic means;

second logic circuits for taking an exclusive OR between an output from the first logic means and an output from the second logic means;

an inverter for inverting an output from the second logic means;

a third phase-shifter for phase-shifting an output signal from the inverting means;

third logic circuits for taking an exclusive OR between an output from the third phase-shifter and an output from the first logic circuits;

a first multiplier for multiplying an output from the first logic circuit and the FM detected signal;

a second multiplier for multiplying an output from the third logic circuit and the FM detected signal;

a third multiplier for multiplying an output from the second multiplier by $\sqrt{2}-1$;

a first adder for adding an output from the first multiplying means and an output from the third multiplier;

a second adder for adding the FM detected signal and an output from the first adder; and a subtracter for subtracting an output from the first adder from the FM detected signal.

Preferably, the third multiplier makes multiplication by $2^{-1}$ instead of that by $\sqrt{2}-1$.

Preferably, the first multiplier is adapted so that if the output from the first logic circuits is "1", the FM detected signal is passed, whereas if the output from the first logic circuits is "0", the FM detected signal is inverted, or otherwise if the output from the first logic circuits is "0", the FM detected signal is passed, whereas if the output from the first logic circuits is "1", the FM detected signal is inverted.

Preferably, the second multiplier is adapted so that if the output from the third logic means is "1", the FM detected signal is passed, whereas if the output from the first logic circuit is "0", the FM detected signal is inverted, or otherwise if the output from the third logic circuit is "0", the FM detected signal is passed, whereas if the output from the third logic means is "1", the FM detected signal is inverted.

In accordance with a second aspect of this invention, there is also provided a method of demodulating an FM stereo signal using the apparatus according to the first aspect.

In accordance with this invention, the 2 bits produced from the approximated sine wave source and the FM detected signal are individually multiplied and thereafter the multiplied results are added. Therefore, the multiplication is carried out as multiplication by 1 bit so that the multiplexed signal can be easily demodulated.

The above and other objects and features of the invention will be more apparent from the following description taken in conjunction with the accompanying drawings.

BRIEF DESCRIPTION OF THE DRAWINGS

FIG. 1 is a diagram showing the configuration of a an FM stereo signal demodulating apparatus according to an embodiment of this invention;

FIG. 2 is a diagram showing the configuration of an approximated sine wave source generator in the embodiment;

FIGS. 3A to 3I are timing charts showing the operation of the approximated sine source generator;

FIGS. 6A and 6B are graphs for explaining the demodulation of the FM stereo signal.

DESCRIPTION OF THE PREFERRED EMBODIMENTS

Figure 4:
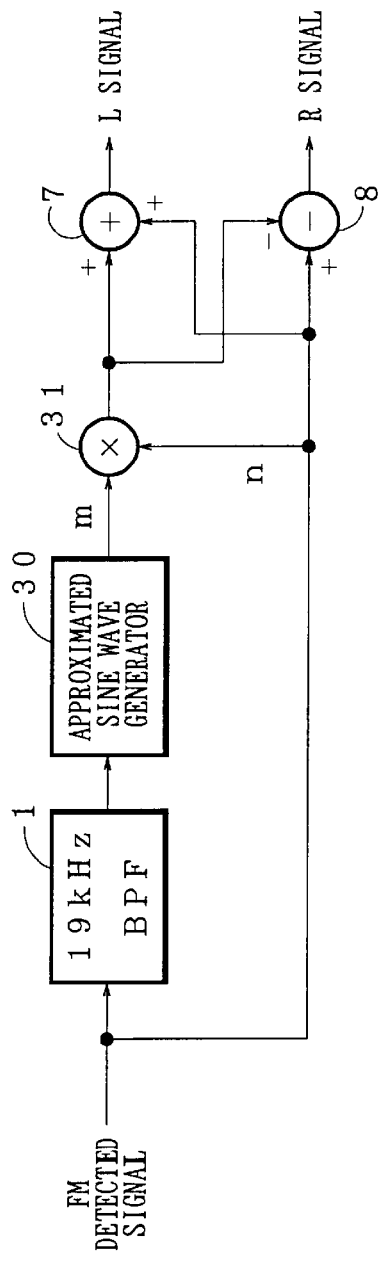
FIG. 4 is a diagram showing the configuration of a conventional FM stereo signal demodulating apparatus.

Now referring to FIGS. 1 and 2, an explanation will be given of an embodiment of this invention. FIG. 1 shows the configuration of a an FM stereo signal demodulating apparatus according to an embodiment of this invention, and FIG. 2 shows the configuration of an approximated sine wave source generator in the embodiment.

As seen from FIG. 1, the FM stereo signal demodulating apparatus according to an embodiment of this invention includes a 19 KHz bandpass filter (BPF) 1 for extracting a signal at 19 KHz from the FM detected signal, an approximated sine wave source generator 2, multipliers 3 and 4, a multiplier 5 for multiplication by $\sqrt{2}-1$, adders 6 and 7 and a subtracter 8.

Further, as seen from FIG. 2, the approximated sine wave source generator 2 includes a first 90-degree phase shifter 21, a first XOR 22, a second 90-degree phase shifter 23, a second XOR 24, an inverter 25, a third 90-degree phase shifter 26 and a third XOR 27.

Figure 5:
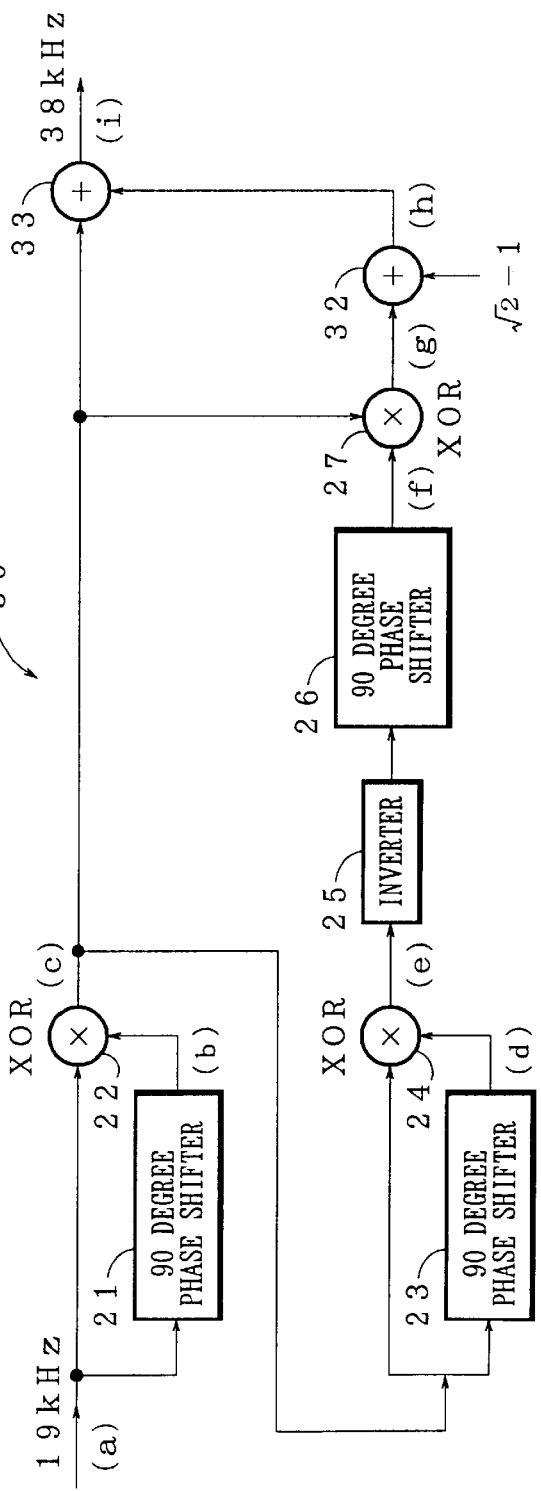
FIG. 5 is a diagram showing the configuration of an approximated sine wave generator in the conventional demodulating apparatus.

In the approximated sine generator 2, the multiplier 32 and adder 33 are removed from the conventional approximated sine wave generator 30 shown in FIG. 5. Therefore, the outputs from the XOR 22 and XOR 27 are produced as output signals (FIGS. 3C and 3G) from the approximated sine wave generator 2, respectively.

Returning to FIG. 1, the output from the XOR 22 in the approximated sine wave source generator 2 and the FM detected signal are multiplied in a multiplier 3. In this case, if the output from the XOR 22 is "1", the FM detected signal is passed, whereas if the output from the XOR 22 is "0", the FM detected signal is inverted. Otherwise, if the output from the XOR 22 is "0", the FM detected signal may be passed, whereas if the output from the XOR 22 is "1", the FM detected signal may be inverted.

The output from the XOR 27 in the approximated sine source generator 2 and the FM detected signal are multiplied in a multiplier 4, and the output from the multiplier 4 is further multiplied by $\sqrt{2}-1$. Specifically, if the output from the XOR 27 is "1", the FM detected signal is passed, and the output from the XOR 27 is "0", the FM detected signal is inverted. Otherwise, if the output from the XOR 27 is "0", the FM detected signal may be passed, and the output from the XOR 27 is "1", the FM detected signal may be inverted. Further, the output from the multiplier 4 is multiplied by $\sqrt{2}-1$.

The output from the multiplier 3 and the output from the multiplier 5 are added in an adder 6. The output from the adder 6 is supplied to an adder 7 and a subtracter 8. The output from the adder 6 and the FM detected signal are subjected to addition in the adder 7 to demodulate the L-signal. Further, the output from the adder 6 and the FM detected signal are subjected to subtraction in the subtracter 8 to demodulate the R-signal.

In the conventional FM stereo signal demodulating apparatus, as explained in connection with FIGS. 4 and 5, the output from the XOR 22 and the output from the XOR 27 are added so that the output from the approximated sine wave generator 30 constitutes m bits. Therefore, the operation of m×n bits must be made in the multiplier 31.

On the other hand, in accordance with this invention, the outputs from the XOR 22 and XOR 27 constitute "1" bit representative of "1" or "0", respectively so that the this 1 bit and the FM detected signal are multiplied in the multipliers 3 and 4, respectively. The multiplied result are added in the adder 6.

Thus, the conventional multiplication of m bit×bit can be carried out using two n×1-bit multipliers 3 and 4 so that it can be easily realized.

The multipliers 3 and 5 can be constructed so that if the output from the approximated sine wave generator 2 is "1" (or "0"), the FM detected signal is passed whereas if the output thereof is "0" (or "1"), the FM detected signal is passed.

In this embodiment, in the multiplier 5, the multiplication by $\sqrt{2}-1$ was made. However, instead of this multiplication, the multiplication by $2^{-1}$ may be made for the approximation to the sine wave. In this way, the digital value which is produced from the multiplier 4 can be multiplied by 1 bit shifting in the multiplier 5.

The multiplication by power of 2 such as $\sqrt{2}-1 \cong 2^{-1} - 2^{-4} - 2^{-6} - 2^{-7}$ may be carried out for the purpose of the above approximation.

What is claimed is:

1. An FM stereo signal demodulating apparatus comprising:
   a filter for extracting a 19 Hz signal from an FM detected signal;
   a first phase-shifter for phase-shifting the 19 Hz signal by 90 degree;
   first logic circuits for taking an exclusive OR between an output from said first phase-shifter and the 19 KHz signal;
   a second phase-shifter for phase-shifting by 90 degree an output signal from said first logic means;
   second logic circuits for taking an exclusive OR between an output from said first logic means and an output from said second logic means;
   an inverter for inverting an output from said second logic means;
   a third phase-shifter for phase-shifting an output signal from said inverting means;
   third logic circuits for taking an exclusive OR between an output from said third phase-shifter and an output from said first logic circuits;
   a first multiplier for multiplying an output from said first logic circuit and said FM detected signal;
   a second multiplier for multiplying an output from said third logic circuit and said FM detected signal;
   a third multiplier for multiplying an output from said second multiplier by $\sqrt{2}-1$;
   a first adder for adding an output from said first multiplying means and an output from said third multiplier;
   a second adder for adding said FM detected signal and an output from said first adder; and
   a subtracter for subtracting an output from said first adder from said FM detected signal.

2. An FM stereo signal demodulating apparatus according to claim 1, wherein said third multiplier makes multiplication by $2^{-1}$ instead of that by $\sqrt{2}-1$.

3. An FM stereo signal demodulating apparatus according to claim 1, wherein said first multiplier is adapted so that if the output from said first logic circuits is "1", said FM detected signal is passed, whereas if the output from said first logic circuits is "0", said FM detected signal is inverted.

4. An FM stereo signal demodulating apparatus according to claim 1, wherein said first multiplier is adapted so that if the output from said first logic circuits is "0", said FM detected signal is passed, whereas if the output from said first logic circuits is "1", said FM detected signal is inverted.

5. An FM stereo signal demodulating apparatus according to claim 2, wherein said first multiplier is adapted so that if the output from said first logic circuits is "1", said FM detected signal is passed, whereas if the output from said first logic circuits is "0", said FM detected signal is inverted.

6. An FM stereo signal demodulating apparatus according to claim 2, wherein said first multiplier is adapted so that if the output from said first logic circuits is "0", said FM detected signal is passed, whereas if the output from said first logic circuits is "1", said FM detected signal is inverted.

7. An FM stereo signal demodulating apparatus according to claims 1 to 6, wherein said second multiplier is adapted so that if the output from said third logic means is "1", said FM detected signal is passed, whereas if the output from said first logic circuits is "0", said FM detected signal is inverted.

8. An FM stereo signal demodulating apparatus according to claims 1 to 6, wherein said second multiplier is adapted so that if the output from said third logic circuits is "0", said FM detected signal is passed, whereas if the output from said third logic circuits is "1", said FM detected signal is inverted.

9. An FM stereo signal demodulating method comprising the steps of:
   extracting a 19 Hz signal from an FM detected signal in a filter;
   phase-shifting the 19 Hz signal by 90 degree in a first phase shifter;
   taking an exclusive OR between an output from said first phase-shifter and the 19 KHz signal in first logic circuits;
   phase-shifting by 90 degree an output signal form said first logic circuits in a second phase shifter;
   taking an exclusive OR between an output from said first logic circuit and an output from said second phase shifter in second logic circuits;
   inverting an output from said second logic circuits in an inverter;
   phase-shifting an output signal from said inverter in a third phase-shifter;
   taking an exclusive OR between an output from said third phase-shifting means and an output from said first logic circuits in third logic circuits;
   multiplying an output from said first logic means and said FM detected signal in a first multiplier;
   multiplying an output from said third logic means and said FM detected signal in a second multiplier;
   multiplying an output from said second multiplier by $\sqrt{2}-1$ in a third multiplier;
   adding an output from said first multiplier and an output from said third multiplier in a first adder;
   adding said FM detected signal and an output from said first adding means in a second adder; and
   a subtracter for subtracting an output from said first adder from said FM detected signal.

* * * * *

UNITED STATES PATENT AND TRADEMARK OFFICE
CERTIFICATE OF CORRECTION

PATENT NO. : 6,714,651 B2
DATED : March 30, 2004
INVENTOR(S) : Yuji Yamamoto

It is certified that error appears in the above-identified patent and that said Letters Patent is hereby corrected as shown below:

Column 6,
Line 42, change "phase-shifting means" into -- phase shifter --
Line 45 and 47, change "means" into -- circuits --
Line 55, change "adding means" into -- adder --
Line 56, cancel "a substracter for"
Line 57, after "signal" insert -- in a subtracter --.

Signed and Sealed this

Second Day of November, 2004

JON W. DUDAS
*Director of the United States Patent and Trademark Office*